(12) United States Patent
Rowe

(10) Patent No.: US 6,873,752 B2
(45) Date of Patent: Mar. 29, 2005

(54) TUNEABLE FIBER OPTIC SENSOR

(75) Inventor: Charles M. Rowe, Orlando, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 0 days.

(21) Appl. No.: 10/637,337

(22) Filed: Aug. 8, 2003

(65) Prior Publication Data

US 2005/0031246 A1 Feb. 10, 2005

(51) Int. Cl.[7] ................................................. G02B 6/00
(52) U.S. Cl. ............................ 385/12; 385/13; 385/52
(58) Field of Search .............................. 385/12, 13, 14, 385/15, 25, 39, 52, 55, 56, 53, 73, 92

(56) References Cited

U.S. PATENT DOCUMENTS

| | | | |
|---|---|---|---|
| 4,374,472 A | * | 2/1983 | Nishimura .................. 73/35.11 |
| 4,408,495 A | | 10/1983 | Couch et al. |
| 4,471,659 A | * | 9/1984 | Udd et al. ..................... 73/655 |
| 4,525,626 A | | 6/1985 | Kush et al. |
| 4,551,694 A | | 11/1985 | Biehl et al. |
| 4,713,540 A | * | 12/1987 | Gilby et al. ............ 250/227.21 |
| 4,875,373 A | * | 10/1989 | Twerdochlib ................ 73/655 |
| 5,063,781 A | | 11/1991 | Conforti et al. |
| 5,146,776 A | * | 9/1992 | Twerdochlib et al. ......... 73/1.85 |
| 5,381,492 A | | 1/1995 | Dooley et al. |
| 6,046,448 A | * | 4/2000 | Sato et al. ................... 250/234 |
| 6,246,638 B1 | | 6/2001 | Zook et al. |

* cited by examiner

*Primary Examiner*—K. Cyrus Kianni

(57) ABSTRACT

A tuneable sensor reed for fiber optic vibration sensors. A sensor reed is mounted inside of a sensor case with an adjustable mounting structure such as a screw, bolt, clamp or cam lock. Adjusting the mounting structure changes the stresses on the sensor reed, and therefore adjusts the base frequency without the need to replace the whole sensor case. In a particular embodiment, the sensor reed is held in place by screws that completely penetrate the sensor case, and adjustments are made at the terminal end of the screw, which is on the outside of the sensor case, using for example, lock nuts. This adjustment allows for a sensor reed to be reset to its base frequency to compensate for such things as frequency drift, or to be set to a new frequency as desired.

9 Claims, 2 Drawing Sheets

TUNEABLE FIBER OPTIC SENSOR

BACKGROUND

Fiber optic vibration sensors have been used in a wide variety of applications, from monitoring machinery conditions to detecting motion for alarm systems. When light passing though a fiber optic sensor passes through a bend in the fiber, that light is susceptible to frequency change due to vibration. This has led to the development of fiber optic sensors where an optical fiber is bent, cut at the apex of the bend, and a grid element is interposed at the bend. FIG. 1 shows an embodiment of a fiber optic vibration sensor. The grid element 2 is the terminus of a flange 4, and is referred to as a sensor reed. As the reed vibrates, the grid, which has numerous slits, disrupts the light crossing the cut 6 in the optical fiber 8, thereby changing the light frequency passing through the optical fiber. Measurements of the changes in the light frequency can therefore be used as a sensitive and accurate vibration detector. In practice, the sensor reed is mounted in a small box-like structure 10 referred to as a sensor case.

The sensor reed will itself have a base frequency, meaning that its vibration is a known factor used in the calculations of the changes in light frequency. The base of the sensor reed, however, is affected by physical stresses on the sensor reed, such as how the sensor reed is mounted inside of the sensor case 12. Therefore, the initial mounting of the sensor reed is a delicate procedure, and has thus far been a permanent, non-adjustable mounting. In many cases the frequency of the sensor reed is adjusted by inserting epoxy or machining the sensor reed to fix the base frequency.

Problems, however, arise, in that the sensor reed is susceptible to frequency drift over time, which is when the base frequency changes to an unknown, or undesirable frequency. Currently, the only solution to this is to, completely replace the whole sensor case, which includes replacing the optical fibers attached to the sensor case, as well as other integrated parts. Similarly, if it is ever desired to operate the sensor reed at a different frequency, it cannot be adjusted and the sensor case needs to be replaced. This is an expensive and time consuming effort. What is needed is a fiber optic sensor that has a sensor reed with an tuneable base frequency.

SUMMARY OF THE INVENTION

The present invention relates to a tuneable sensor reed for fiber optic vibration sensors. A sensor reed is mounted inside of a sensor case; with an adjustable mounting structure such as a screw, bolt, clamp or cam lock. Adjusting the mounting structure changes the stresses on the sensor reed, and therefore adjusts the base frequency without the need to replace the whole sensor case. In a particular embodiment, the sensor reed is held in place by screws that completely penetrate the sensor case, and adjustments are made at the terminal end of the screw, which is on the outside of the sensor case, using for example, lock nuts. This adjustment allows for a sensor reed to be reset to its base frequency to compensate for such things as frequency drift, or to be set to a new frequency as desired.

In one embodiment, the mounting structure comprises at least one of a screw, bolt, nut, wing-nut, knob, clamp, vice and cam-lock. Similarly, the adjustment structure of the mounting structure can be at least one of a screw, bolt, nut, wing-nut, knob, clamp, vice and cam-lock.

In another particular embodiment the adjustable mounting structure is integrally joined with the sensor reed.

In another particular embodiment, the adjustment structure are located on the outside of the sensor case.

In still another embodiment the adjustable mounting structure further comprises at least one adjustable and one non-adjustable mount.

DETAILED DESCRIPTION OF THE INVENTION

Figure 1:
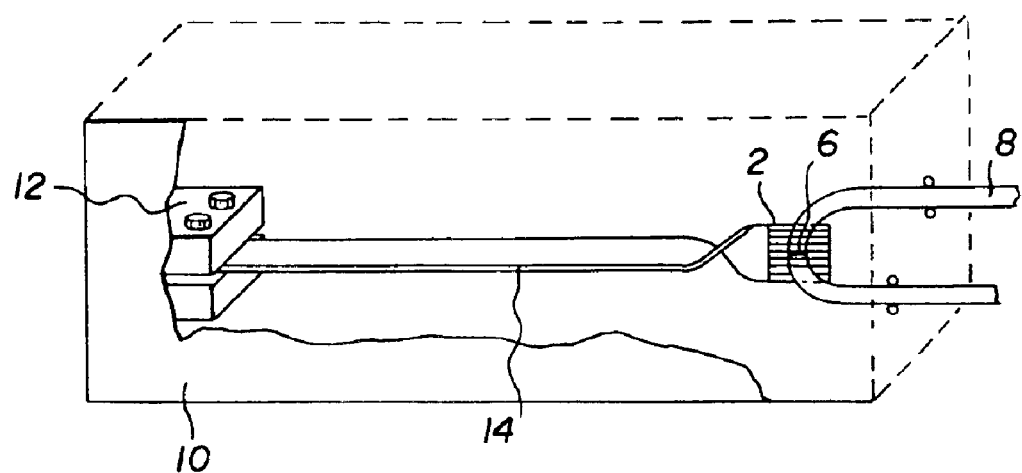
FIG. 1 illustrates a sensor case according to the prior art where the sensor reed in non-adjustably mounted to the sensor case.

In one embodiment the present invention is a tuneable fiber optic vibration sensor that comprises a sensor case that houses a segment of an optical fiber and a sensor reed that has a base frequency. The sensor reed is adjustably mounted by an adjustable mounting structure to the sensor case, and the adjustable mounting structure itself comprises at least one adjustment structure. Adjustments to the adjustable mounting structure are performed by adjusting the adjustment structure, which then causes changes to the base frequency of the sensor reed.

In a particular embodiment, the mounting structure comprises at least one of a screw, bolt, nut, wing-nut, knob, clamp, vice and cam-lock. Similarly, the adjustment structure of the mounting structure can be at least one of a screw, bolt, nut, wing-nut, knob, clamp, vice and cam-lock.

In another particular embodiment the adjustable mounting structure is integrally joined with the sensor reed. This may be accomplished by glue, epoxy, welding, fabricating the sensor reed and the mounting structure from the same article, or other ways apparent to one of ordinary skill in the art. In this embodiment, adjustments to the mounting structure will affect the stresses between the sensor reed and the sensor case, but will not create additional stresses between the sensor reed and the mounting structure.

In another particular embodiment, the adjustment structure are located on the outside of the sensor case, and the sensor case does not have to be opened to access the adjustment structure.

In another embodiment the adjustable mounting structure further comprises at least one non-adjustable mount. For example, the sensor reed may be mounted to the sensor case by two, three, or even more screws where only one of the of the screws is adjustable. Similarly, there may be multiple adjustment structure, where some or all of the mounts are adjustable. Further, when there are at least two adjustment structure present, they do not have to be the same adjustment structure. This may then be used as a particular embodiment where at least one of the adjustment structure is a coarse adjustment structure and at least one is a fine adjustment structure.

In another embodiment of the present invention a tuneable fiber optic vibration sensor comprises a sensors case that houses a segment of an optical fiber and a sensor reed that has a base frequency. The sensor reed is adjustably mounted to the inside of the sensor case by an adjustable screw. The adjustable screw penetrates an exterior boundary of the sensor case and torsion on the screw is adjustable by making adjustments on an adjustment structure located on the portion of the screw that penetrates the exterior boundary of the sensor case. Making this adjustment from the exterior of the sensor case adjusts the base frequency of the sensor reed.

In still another embodiment of the present invention a method provides for the tuning of a base frequency of a sensor reed that is part of a fiber optic sensor. This method comprises mounting the sensor reed into a sensor case with an adjustable mounting structure. The mounting structure itself comprises at least one adjustment structure, and mounting the sensor reed to the sensor case exposes it to mounting stresses that affect a base frequency of the sensor reed. Then adjustments to the adjustment structure are made, where the adjustments change the mounting stresses of the sensor reed thereby changing the base frequency.

In a particular embodiment of this method the mounting structure comprises at least one of a screw, bolt, nut, wing-nut, knob, clamp, vice and cam-lock.

In another particular embodiment of this method, the mounting structure comprises at least one of a screw, bolt, nut, wing-nut, knob, clamp, vice and cam-lock. Similarly, the adjustment structure of the mounting structure can be at least one of a screw, bolt, nut, wing-nut, knob, clamp, vice and cam-lock.

In another particular embodiment, the adjustment structure adjustable only to tighten the stresses on the sensor reed. In a related embodiment, the adjustments allow for the tightening of the adjustment structure only to a certain, predetermined point. If there are multiple mounts used in the adjustment structure, some of them may be freely adjustable, while others are only adjustable to a predetermined degree.

In still another particular embodiment the adjustable mounting structure is integrally joined with the sensor reed. This may be accomplished by glue, epoxy, welding, fabricating the sensor reed and the mounting structure from the same article, or other ways apparent to one of ordinary skill in the art. In this embodiment, adjustments to the mounting structure will affect the stresses between the sensor reed and the sensor case, but will not create additional stresses between the sensor reed and the mounting structure.

In another particular embodiment of this method, the adjustment structure are located on the outside of the sensor case, and the sensor case does not have to be opened to access the adjustment structure.

In a conventional fiber optic vibration sensor, a light beam, emanating from an optical fiber intersects a grid before being received by suitable light receiving and evaluating circuitry. The grid is mounted to oscillate on a sensor reed support in response to environmental vibrations. Upon oscillation of the grid, the light beam is periodically traversed both by opaque portions and slits of the grid. In this manner, the light passing through the grid and received by the suitable circuitry is in the form of a pulsed-light signal. Furthermore, the pulsed-light signal for each cycle of oscillation of the grid, each cycle being composed of one upswing and one downswing, the grid oscillation frequency being constant, can be evaluated in the evaluation circuitry to determine the amplitude of oscillation. That is, as the amplitude of oscillation increases, the number of slits and opaque portions of the grid traversing the light beam per cycle of oscillation increases. On the other hand, as the amplitude of oscillation decreases, then the number of slits and, opaque portions of the grid traversing the light beam per cycle decreases. The frequency of the environmental vibrations can be used as a time reference for a pulse count within the evaluation circuitry.

It should be noted however that the use of a graded slit density pattern grid having a constant slit gradient does not effect the light signal receiving and evaluation circuitry. This circuitry responds to the total number of light pulses per cycle of oscillation. Thus, while the evaluation circuitry may receive fewer pulses from the graded slit pattern grid swinging in one direction, the circuitry receives a greater number of pulses from the graded slit pattern grid swinging in that direction than such circuitry would receive with a uniform slit density pattern grid. That is, the deficiency in the number of pulses occurring during swings in that is compensated by the excess in the number of pulses occurring during the swings. In this manner, the total number of light pulses per cycle of oscillation received by the evaluation circuitry remains the same whether a uniform slit density pattern grid or a graded slit pattern grid having a constant slit gradient is used.

Furthermore, while the described grids thus far include the use of open slits through which light may pass, it is also considered to be within the scope of the present invention to employ light reflective strips in place of the slits. In this manner, a receiver of the pulsed-light signals will receive such signals as reflections from the reflective strips. Additionally, other individual light-altering mechanisms may be used in place of individual slits without, detracting from the scope of the present invention.

FIG. 1 shows a fiber optic vibration sensor of the prior art. However, a fiber optic vibration sensor according to the present invention may have an appearance very similar to the prior art shown in FIG. 1. In the present invention, the mounting structure 12 would be adjustable rather than fixed.

Figure 2:
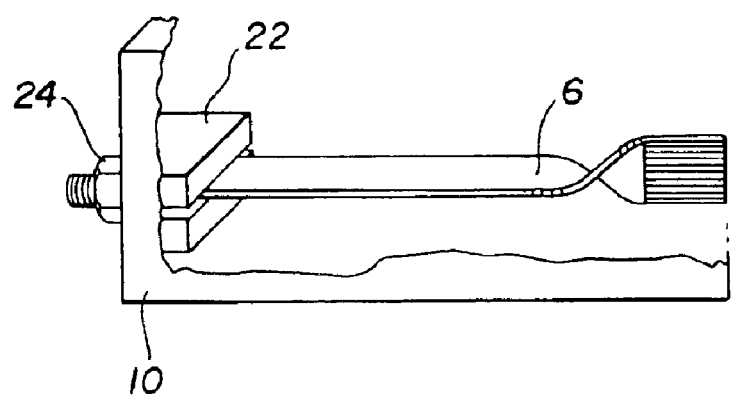
FIG. 2 illustrates one embodiment of an adjustable mounting structure according to the present invention.

Due to the fact that an open cut in the fiber optic cable is exposed inside of the sensor case, it is imperative that the case be completely opaque and otherwise light proof. This requirement therefore leads to sensor case designs that are completely sealed and are difficult or impossible to open. Therefore, in one embodiment, the present invention contemplates having an adjustable mounting structure where the adjustments are made outside of the sensor case. An example of this is shown in FIG. 2, where the adjustable mounting structure 22 is adjusted 24 from the outside of the sensor case 10. FIG. 2 also shows an example of the adjustable mounting structure being integral with the sensor reed. This allows for maximum effect when adjusting the adjustment structure, and also for more evenly dispersing the mounting stresses caused by such adjustments.

One of the uses for the present invention is to adjust the base frequency of the sensor reed after it has suffered from frequency drift. In the prior, the only method of dealing with a sensor reed that has experience frequency drift is to wholly replace the sensor reed, the supporting sensor case, and the attached fiber optic cables. The present invention allows for the sensor reed to be adjusted after experiencing sensor drift, saving the costs and effort associated with replacing the entire sensor case. Another use of the present invention, however, is that the adjustable frequency on the sensor reed may be used when the sensor case is being manufactured or initially set.

A current problem in making fiber optic vibration sensor is that initially setting the frequency of the sensor reed is a very delicate procedure, often requiring much effort and resulting in false attempt. By the use of the present invention, the sensor reed's base frequency may be more easily adjusted at the outset.

Figure 3:
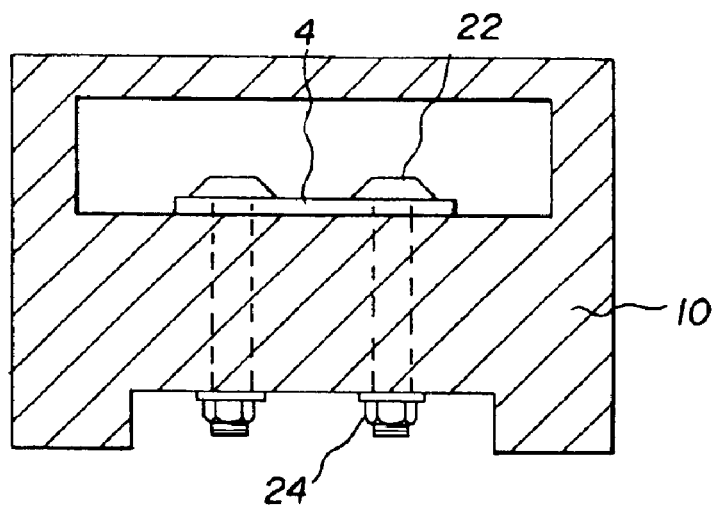
FIG. 3 illustrates a side view of an adjustable mounting structure of the present invention.

FIG. 3 shows another embodiment of accessing the adjustment structure from the exterior of the sensor case.

This figure shows a cross sectional end-on view of a sensor case according to the present invention. The adjustable mounting structure 22 is a screw that extends completely trough the sensor case 10. By adjusting the nut 24, the base frequency of the sensor reed may be adjusted. Similar to a simple nut 24, a wing-nut, cam lock or other similar device may be used. In this figure, access to the nuts are in a recessed cavity on the outer surface of the sensor case 10. This need not always be the case, and the adjustment structure may be flush with, or even raised from the sensor case.

Figure 4:
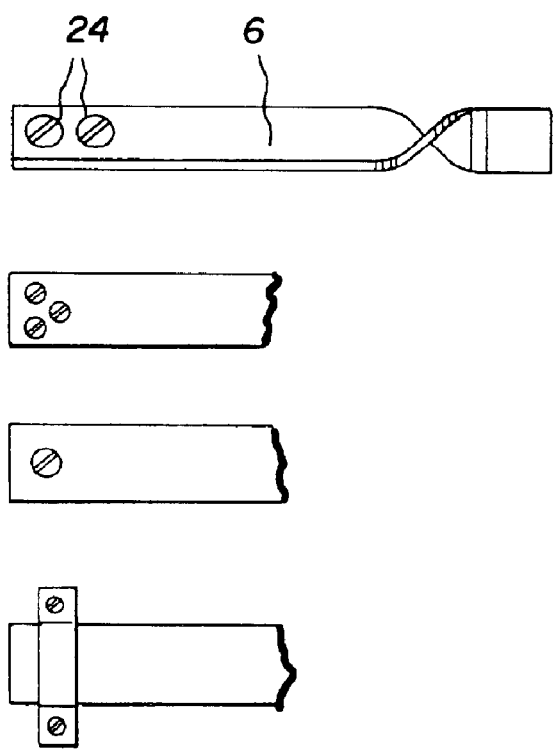
FIG. 4 illustrates various embodiments of the spacing of ones or more mounts used in the mounting structure.

As shown in FIG. 3, there are at least two adjustable mounting structure securing the sensor reed 6 to the sensor case 10. The present invention, however, contemplates one, two, three, four or more mounting structure. Multiple mounting structure may be positioned in a variety of configurations relative to one another, just a few of which are shown in FIG. 4. Further, not all mounting structure mounting a sensor reed to a sensor case need be the same type of mounting structure, and not every mounting structure needs to be adjustable. Therefore, an adjustable mounting structure may refer to a plurality of mounts wherein at least one of them is adjustable. Further, when at least two adjustable mounting structure are being used, one of them may be a coarse adjustment and the other a fine adjustment.

The adjustable mounting structure 24 may be integrally joined with the sensor reed 6, such that the two are permanently joined and any adjustments made to the adjustable mounting structure will not affect the stresses between the adjustable mounting structure and the sensor reed.

Though vibration is a common feature detected by these types of fiber optic sensor, other attributes and characteristics, such as temperature, may be detected as would be apparent to one of ordinary skill in the art. The use of the term fiber optic vibration sensor does not preclude any of these additional uses. In fact, conventional optical vibration sensors can be environmentally affected in that the sensor reed on which the grid is mounted exhibits changes in vibrational qualities in dependence upon changes in environmental temperature. If the amplitude of the vibration being sensed is constant, the amplitude of grid oscillations and thus the number of light pulses per cycle of oscillation in conventional optical vibration sensors changes as the environmental temperature changes. Since the amplitude of the swings of the grid per cycle of oscillation determines the number of pulses received by the evaluation circuitry per cycle, it will be apparent that the changes in the amplitude of the swings due to environmental temperature changes, rather than changes in the amplitude of the environmental vibrations. Therefore temperature may be either an environmental factor to be compensated for, or a feature measurable by the fiber optic vibration sensor.

In a specific embodiment, the sensor reed is mounted in a molded sensor case, approximately 1 inch by 1 inch by 2.5 inches (2.5 cm×2.5 cm×6.4 cm). The sensor case is hollow, allowing for the sensor reed to be mounted within the case, secured at one end, but otherwise free standing from the rest of the sensor case. The grid at the free end of the sensor reed intercepts a fiber optic that is threaded through the end of the sensor case.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A tuneable fiber optic vibration sensor comprising:

a sensor case that houses a segment of an optical fiber; and a sensor reed that has a base frequency mounted inside of said sensor case;

wherein said sensor reed is adjustably mounted by an adjustable mounting structure to said sensor case;

wherein said adjustable mounting structure comprises at least one adjustment structure;

wherein adjusting said adjustment structure changes said base frequency.

2. The fiber optic vibration sensor of claim 1, wherein said mounting structure comprises at least one of a screw, bolt, nut, wing-nut, knob, clamp, vice and cam-lock.

3. The fiber optic vibration sensor of claim 1, wherein said adjustment structure is at least one of a screw, bolt, nut, wing-nut, knob, clamp, vice and cam-lock.

4. The fiber optic vibration sensor of claim 1, wherein said adjustable mounting structure is integrally joined with said sensor reed.

5. The fiber optic vibration sensor of claim 1, wherein said adjustment structure is accessible from the outside of said sensor case.

6. The fiber optic vibration sensor of claim 1, wherein said adjustable mounting structure further comprises at least one non-adjustable mount.

7. The fiber optic vibration sensor of claim 1, wherein said adjustable mounting structure comprises a plurality of adjustment structure.

8. The fiber optic vibration sensor of claim 7, wherein at least one of said plurality of adjustment structure is a coarse adjustment structure and at least one of said plurality of adjustment structure is a fine adjustment structure.

9. A tuneable fiber optic vibration sensor comprising:

a sensors case that houses a segment of an optical fiber; and a sensor reed that has a base frequency;

wherein said sensor reed is adjustable mounted to the inside of said sensor case by an adjustable screw;

wherein said adjustable screw penetrates an exterior boundary of said sensor case and torsion on said screw is adjustable by making adjustments on an adjustment structure located on the portion of said screw that penetrates the exterior boundary of said sensor case;

wherein adjusting said screw from the exterior of said sensor case adjusts said base frequency.

* * * * *